(12) United States Patent
Smith

(10) Patent No.: US 6,361,013 B1
(45) Date of Patent: Mar. 26, 2002

(54) LOAD RACK APPARATUS

(76) Inventor: Barry F. Smith, Box 256 R.D. #1, Roaring Spring, PA (US) 16673

( * ) Notice: Subject to any disclaimer, the term of this patent is extended or adjusted under 35 U.S.C. 154(b) by 0 days.

(21) Appl. No.: 09/497,715

(22) Filed: Feb. 4, 2000

(51) Int. Cl.[7] ................................................ A47B 9/00
(52) U.S. Cl. ................................ 248/346.02; 108/55.3
(58) Field of Search ..................... 248/346.02, 346.1, 248/671; 211/59.4; 108/55.3, 57.29, 57.25, 57.11, 57.26, 56.3, 57.28, 901, 902

(56) References Cited

U.S. PATENT DOCUMENTS

| | | | | |
|---|---|---|---|---|
| 2,661,172 A | * | 12/1953 | Needham | 248/671 |
| 2,778,590 A | * | 1/1957 | Jeannero | 108/55.3 |
| 2,885,165 A | * | 5/1959 | Smolen | 248/671 |
| 3,071,269 A | * | 1/1963 | Moulds, Jr. | 108/55.3 |
| 3,387,811 A | * | 6/1968 | Adams, Jr. | 248/346.01 |
| 3,590,752 A | * | 7/1971 | De Pew | 108/55.3 |
| 4,305,508 A | * | 12/1981 | Rodgers | 108/55.3 |
| 4,382,733 A | * | 5/1983 | Rodgers | 108/55.3 |
| 4,747,495 A | * | 5/1988 | Hoss | 108/55.3 |
| 5,882,170 A | | 3/1999 | Walton | 414/462 |

\* cited by examiner

*Primary Examiner*—Anita King
*Assistant Examiner*—Gwendolyn Baxter
(74) *Attorney, Agent, or Firm*—Pietragallo, Bosick & Gordon

(57) ABSTRACT

A mechanical apparatus for loading and securing a load in transit. The mechanical apparatus includes (a) a platform formed by a first horizontal member, a first vertical member, a second horizontal member and a second vertical member, and (b) at least one arch shaped structure positioned above the horizontal and vertical members of the platform for receiving the load. Multiple apparatuses may be stacked upon each other for ease of storage and transportation in an unloaded condition.

25 Claims, 3 Drawing Sheets

LOAD RACK APPARATUS

BACKGROUND OF THE INVENTION FOR ROLL STOCK

1. Field of the Invention

This invention relates to an apparatus for enabling the secure transport of a load in transit.

2. Brief Description of the Background Art

A secure engagement of a load in transit is essential for the safe handling of goods over the roadways, and in the air and/or water. For example, because many goods are transported over roadways that have steep inclines, surfaces that are rough or uneven and are sloped from side to side, the forces of gravity will cause goods to shift during transit. Further, for example, traffic patterns over the roadways due to congestion of the roadway or inclement weather may attribute to additional physical forces that are placed upon the goods resulting from sudden acceleration or deceleration of the transportation source, such as for example but not limited to, a motor vehicle and/or trailer, containing the goods that are being transported. Any one or combination of the above-mentioned factors may cause the goods to shift in the transportation source containing the goods. Such shifting of goods being transported poses an unstable situation, such as for example, for the driver of the motor vehicle and/or trailer that may lead to the driver's loss of control of the motor vehicle and/or trailer on the roadway. Further, such shifting of the goods housed within the transportation source, such as for example, the motor vehicle and/or trailer, may cause a rupture of the walls of the transportation source resulting in spillage of the goods onto land, and/or into the air and/or water. It will be appreciated, for example, that damage to the driver, the transportation source, the goods and any third party and/or chattel of a third party in the pathway of the transportation source is likely to occur if the goods shift and the driver of the motor vehicle and/or trailer looses control of the motor vehicle and/or trailer. Thus, it is desirable to secure loads being transported from one destination to another to avoid the possible destruction of the goods, potential injuries to human beings or the loss of life, and possible damage to other items of value. The secure engagement of goods in transit shall enable the successful delivery of the goods to the intended end user and provide an increased level of safety on the roadways and waterways and/or in the air. The instant invention is particularly useful for loading and securing loads of goods onto a transportation source wherein the goods or the packaging for the goods are in the form of a round, elliptical or parabolic shape, such as for example but not limited to, rolls of paper stock, piping, telegraph poles, and tubular containers.

U.S. Pat. No. 5,882,170 (Walton) discloses an apparatus for loading a water craft onto the bed of a pickup truck that includes a cradle assembly for supporting the water craft within the bed of the pickup truck.

In spite of this background art, there remains a very real and substantial need for an apparatus for enabling the ease of loading and securing a load of goods to a transportation source for improving the safe transportation of the goods over land, and/or in the air and/or water.

SUMMARY OF THE INVENTION

The present invention has met the above-described need. The apparatus of the present invention provides an efficient and economical approach for substantially reducing and/or eliminating the undesired problems associated with accidental and/or unintentional shifting of goods while in transit. Further, this invention provides for an easy to use and safe apparatus for the loading of goods, such as for example but not limited to, large bulky goods, onto a transportation source, such as for example but not limited to, a motor vehicle and/or trailer, boxcar, a water craft and/or aircraft.

The apparatus of this invention provides for the secure engagement of a load in transit. The apparatus includes a platform having (a) a first horizontal member having a proximal end, a distal end and a middle section that is disposed between the proximal end and the distal end of the horizontal member, (b) a first vertical member having a proximal end, a distal end and a middle section that is disposed between the proximal end and the distal end of the first vertical member, and wherein the proximal end of the first vertical member is in communication with the distal end of the first horizontal member, (c) a second horizontal member having a proximal end, a distal end and a middle section that is disposed between the proximal end and the distal end of the second horizontal member, wherein the proximal end of the second horizontal member is in communication with the distal end of the first vertical member, and (d) a second vertical member having a proximal end, a distal end and a middle section that is disposed between the proximal end and the distal end of the second vertical member, wherein the proximal end of the second vertical member is in communication with the distal end of the second horizontal member, and wherein the distal end of the second vertical member is in communication with the proximal end of the first horizontal member. Preferably, the first horizontal member is parallel in relation to the second horizontal member and wherein the first vertical member is parallel in relation to the second vertical member. The apparatus further includes at least one arch shaped structure, wherein the arch shaped structure has a proximal end, a distal end and a middle section disposed between the proximal end and the distal end of the arch shaped structure. The arch shaped structure has an outer surface and an inner surface. At least a portion of the arch shaped structure is positioned above at least a portion of one of the horizontal members of the platform. Further, the apparatus includes wherein at least a portion of the middle section of the arch shaped structure is in communication with a portion of at least one of the proximal end, distal end, middle section and combinations thereof of the horizontal member. At least a portion of the middle section of the arch shaped structure is positioned, with regard to the longitudinal axis of at least one of the horizontal members, in the same longitudinal plane of at least one of the horizontal members of the platform. The proximal end and the distal end of the arch shaped structure are positioned, relative to each other, in similar upward directions and in opposing outward directions in such a manner that the proximal end and the distal end of the arch shaped structure lie on opposite sides of the longitudinal plane with regard to the longitudinal axis of the horizontal member.

In another embodiment of the instant invention, the apparatus, as described herein, includes wherein the vertical members and the horizontal members each comprise a rail wherein the rail has a front face, a back face, a top and a bottom, and a center section disposed between the front face, the back face, the top and the bottom of the rail. The apparatus of this invention includes wherein at least one of the rails of one of the vertical members has at least one slot that begins at the front face of the rail of the vertical member and extends through at least a portion of the center of the rail of the vertical member. Preferably, the slot further extends through all of the center of the rail and terminates at the back face of the rail. The slot of the present invention is provided for accommodating the engagement of at least one tine of a fork lift. Engagement of the tine of the fork lift into the slot of the vertical member of the platform of this invention allows for the efficient movement and placement of the apparatus bearing a load of goods on to, such as for example but not limited to, a bed of a motor vehicle and/or trailer, boxcar, and/or into a hull of a water craft and/or aircraft.

In another embodiment of this invention, the apparatus further includes at least one foot means for supporting the platform, wherein the foot means is mounted to at least one of the rails. Further, the foot means provides for stacking one apparatus of this invention upon another substantially identical apparatus of this invention. Preferably, another embodiment of the apparatus of this invention includes at least one foot adjusting means for adjusting the movement and the position of the platform is provided wherein the foot adjusting means is in juxtaposition to and in communication with at least one of the rails.

Another embodiment of this invention provides a transportation source having a flat bed wherein the platform of the the apparatus of the instant invention for securing a load in transit rests upon the flat bed of the transportation source. The transportation source may be any transportation source known by those skilled in the art, such as for example, a truck-trailer.

The apparatus of the instant invention will be more fully understood from the following descriptions of the invention, and the drawings and the claims appended hereto.

DETAILED DESCRIPTION OF THE INVENTION

The present invention provides for a mechanical apparatus for the loading of goods onto a transportation source and for securing the load of goods in transit.

Figure 1:
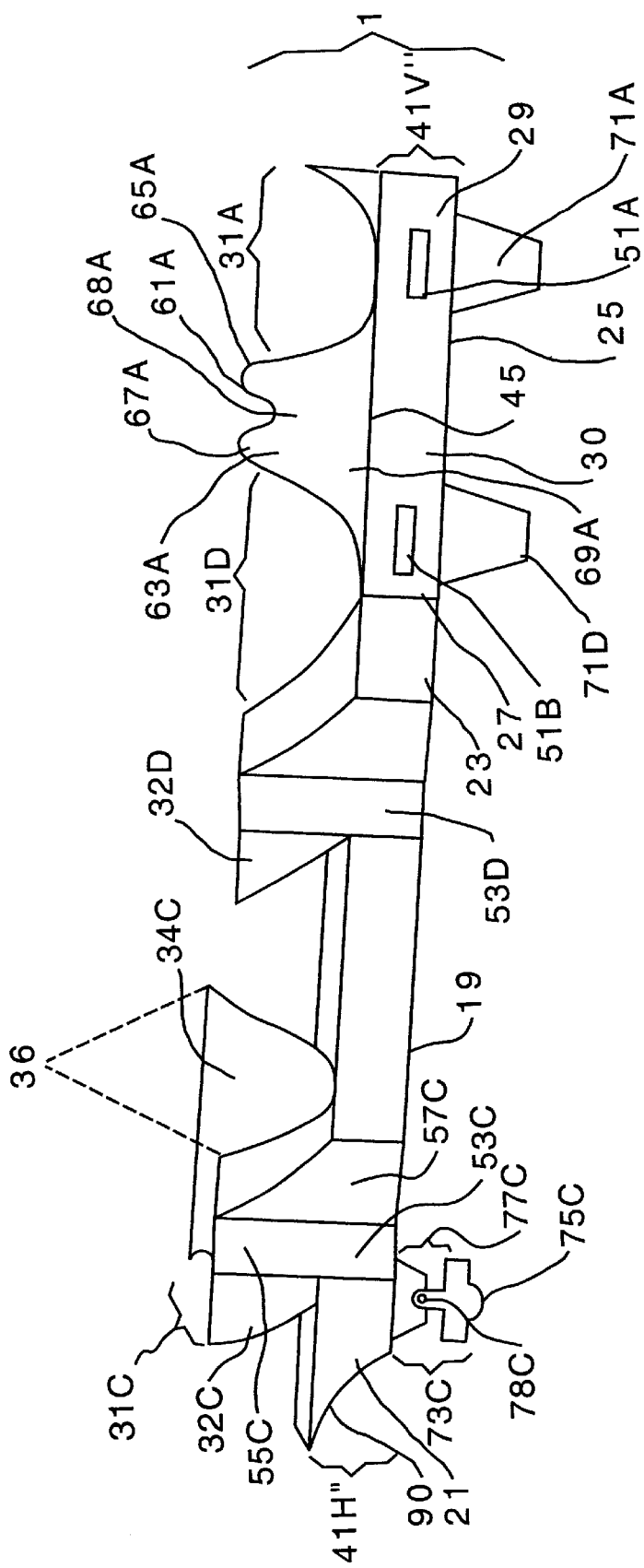
FIG.1 is a partial perspective view illustrating the horizontal and vertical members of the platform, the arch shaped structures, foot means, and the slots of the apparatus of the present invention.
Figure 2:
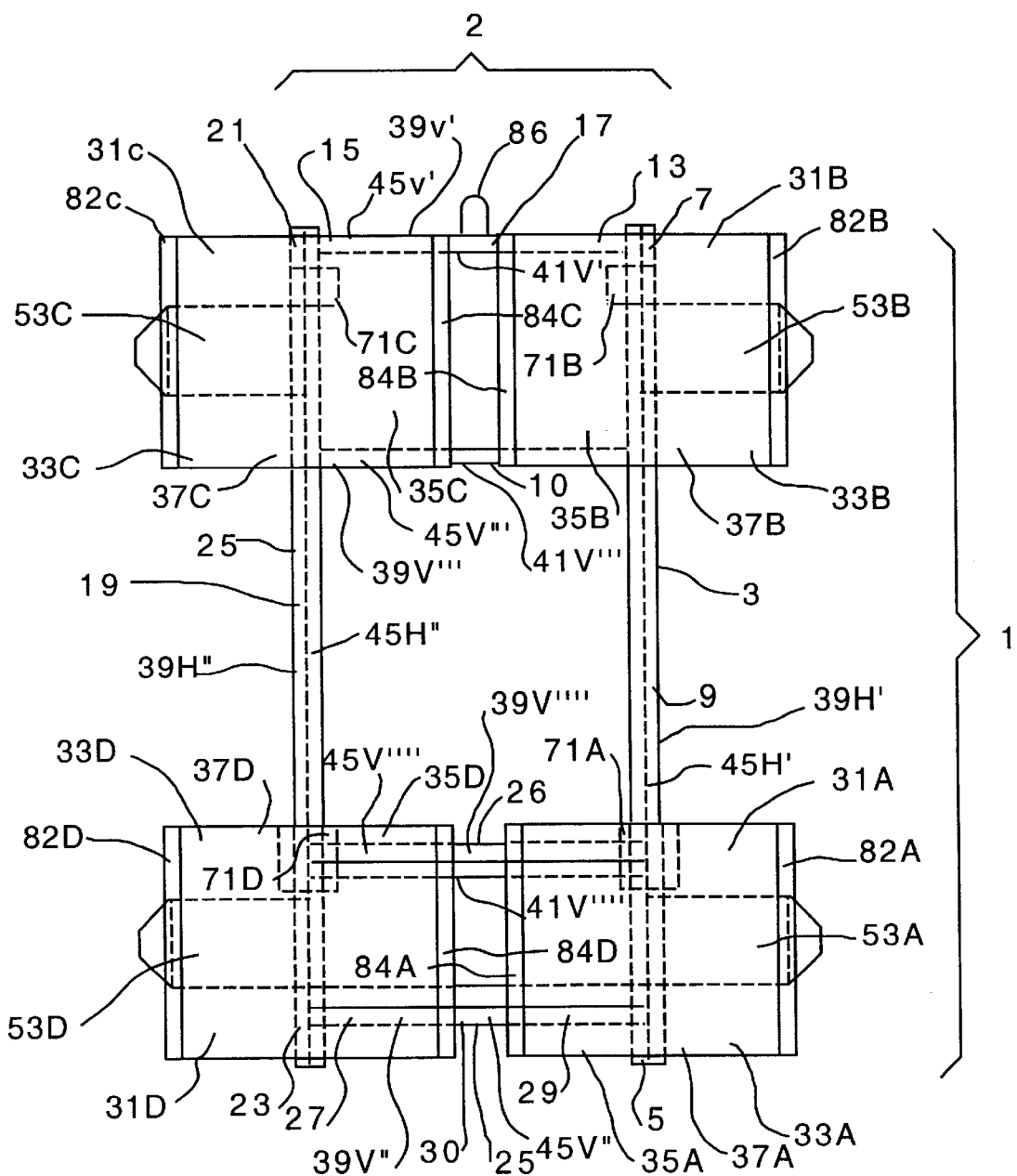
FIG. 2 is a view top view of the apparatus of the present invention.
Figure 3:
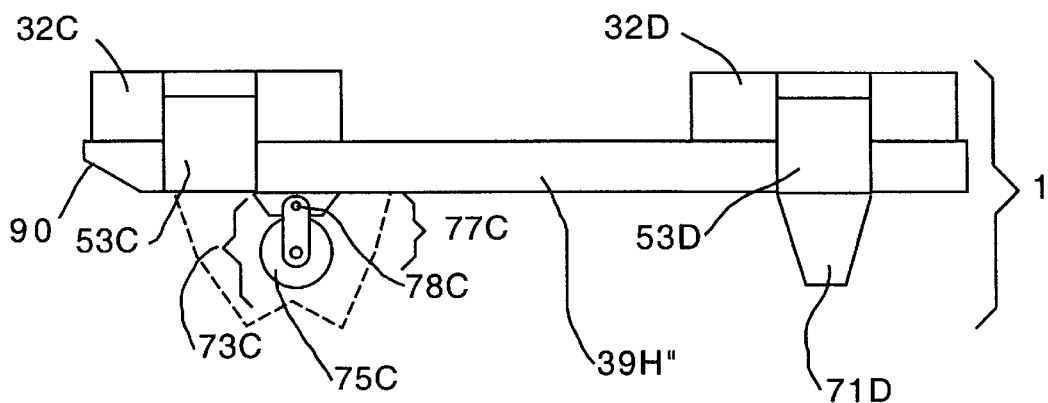
FIG. 3 is a side view of the apparatus of the present invention.

FIGS. 1–4 illustrate various views of a preferred form of the mechanical apparatus 1 of the present invention for loading and securing goods prior to commencing transportation of the same. In FIGS. 1–4, a mechanical apparatus having a platform 1 is provided. The platform 2 has (a) a first horizontal member 3 (as shown in FIG. 2) having a proximal end 5, a distal end 7 and a middle section 9 that is disposed between the proximal end 5 and the distal end 7 of the first horizontal member 3, (b) a first vertical member 11 (as shown in FIGS. 2 and 3) having a proximal end 13, a distal end 15 and a middle section 17 that is disposed between the proximal end 13 and the distal end 15 of the first vertical member 11, and wherein the proximal end 13 of the first vertical member 11 is in communication with the distal end 7 of the first horizontal member 3, (c) a second horizontal member 19 (FIGS. 1 and 2) having a proximal end 21, a distal end 23 and a middle section 25 that is disposed between the proximal end 21 and the distal end 23 of the second horizontal member 19, wherein the proximal end 21 of the second horizontal member 19 is in communication with the distal end 7 of the first vertical member 11, and (d) a second vertical member 25 (FIGS. 1 and 2) having a proximal end 27, a distal end 29 and a middle section 30 that is disposed between the proximal end 27 and the distal end 29 of the second vertical member 25, wherein the proximal end 27 of the second vertical member 25 (FIGS. 1 and 2) is in communication with the distal end 23 of the second horizontal member 19, and wherein the distal end 29 of the second vertical member 25 is in communication with the proximal end 5 of the first horizontal member 3. In FIG. 2, the first horizontal member 3 is parallel in relation to the second horizontal member 19, and wherein said first vertical member 11 is parallel in relation to said second vertical member 25.

In a preferred embodiment of this invention, the mechanical apparatus of the present invention further includes a third vertical member 10 and a fourth vertical member 26 as shown in FIG. 2 that are each disposed perpendicular to and in communication with the first horizontal member 3 and the second horizontal member 19. The third and fourth vertical members, 10 and 26, respectively, are in a parallel position in relation to the first vertical member 11 and the second vertical member 25. The third vertical member 10 and the fourth vertical member 26 are optional features of the mechanical apparatus of the present invention and provide added structural support to the platform 2

FIGS. 1–4 show at least one arch shaped structure 31X (wherein X equals A, B, C and D, respectively, and combinations thereof). The arch shaped structure 31X has a proximal end 33X, a distal end 35X and a middle section 37X disposed between the proximal end 33X and the distal end 35X, wherein X equals A, B, C and D, respectively, of the arch shaped structure 31X. The arch shaped structure 31X has an outer surface 32X and an inner surface 34X, wherein X is equal to A, B, C and D, respectively, as set forth in FIG. 1. FIGS. 1–4 show at least a portion of the arch shaped structure 31X is positioned above at least a portion of one of the horizontal members 3, 19, respectively. In FIG. 2, at least a portion of the middle section 37A of the arch shaped structure 31A is in communication with a portion of the proximal end 5 of the first horizontal member 3. In FIG. 2, at least a portion of the middle section 37B of the arch shaped structure 31 B is in communication with a portion of the distal end 7 of the first horizontal member 3. In FIG. 2, at least a portion of the middle Section 37C of the arch shaped structure 31C is in communication with a portion of the proximal end 21 of the second horizontal member 19. In FIG. 2, at least a portion of the middle section 37D of the arch shaped structure 31D is in communication with a portion of the distal end 23 of the second horizontal member 19.

Figure 4:
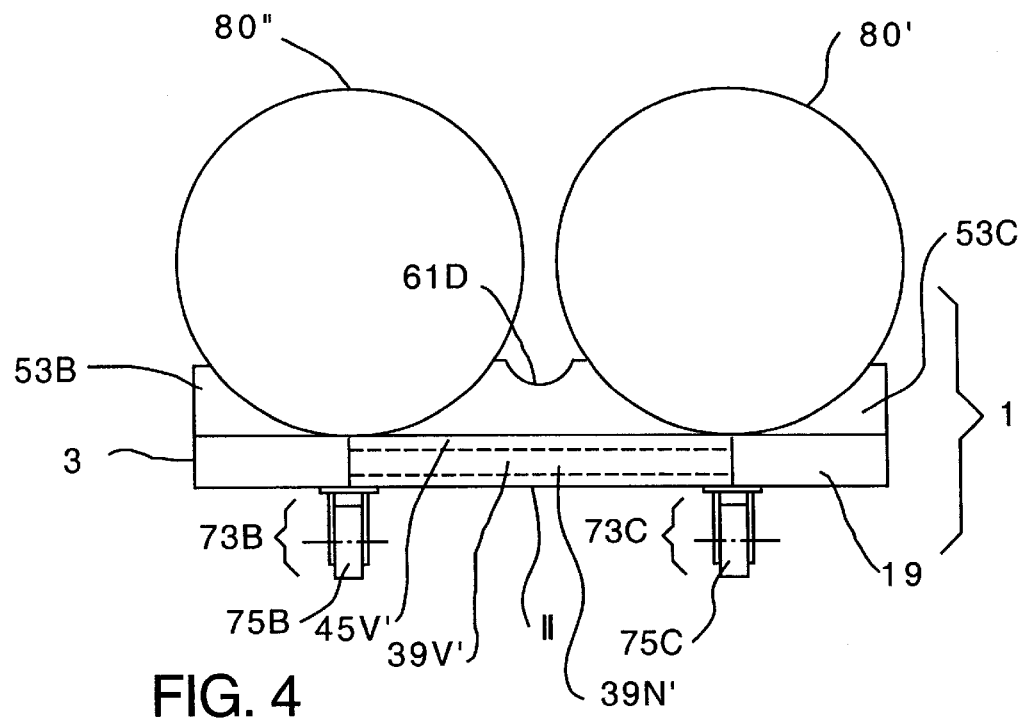
FIG. 4 is a rear view of the apparatus of the present invention.

FIG. 2 shows that at least a portion of the middle section 37A and 37B of arch shaped structure 31A and 31B, respectively, is positioned, with regard to the longitudinal axis (not shown) of the first horizontal member 3, in the same longitudinal plane of the first horizontal member 3. FIG. 2 shows that at least a portion of the middle section 37C and 37D of the arch shaped structure 31C and 31D, respectively, is positioned, with regard to the longitudinal axis (not shown) of the second horizontal member 19, in the same longitudinal plane of the second horizontal member 19 of the platform 2. In FIGS. 1, 2 and 4, the proximal end 33X and the distal end 35X of the arch shaped structure 31X are positioned, relative to each other, in similar upward directions and in opposing outward directions in such a manner that the proximal end 33X and the distal end 35X of the arch shaped structure 31X lie on opposite sides of the longitudinal plane with regard to the longitudinal axis of the horizontal members 3, 19, respectively.

FIG. 2 shows that the vertical members 11, 25, 10 and 26 each comprise a rail 39V', 39V", 39V''', and 39V'''', respectively, and that the horizontal members 3, 19 each comprise a rail 39H' and 39H", respectively. Each rail 39V', 39V", 39V''', 39V'''',39H' and 39H" hasa front face 41V', 41V", 41V''', 41V'''', 41H' and 41H" (41H" and 41V" shown in FIG. 1), respectively, a back face 43V', 43V", 43V''', 43V'''', 43H' and 43H" (not shown), respectively, a top 45V', 45V", 45V''', 45V'''', 45H' and 45H" (FIG. 2), respectively, and a bottom 47V', 47V", 47V''', 47V'''', 47H' and 47H" (not shown), respectively, and a center section 49V', 49V", 49V''', 49V'''', 49H' and 49H" (not shown), respectively, disposed between the front face 41V', 41V", 41V''', 41V'''', 41H' and 41H", respectively, the back face 43V', 43V", 43V''', 43V'''', 43H' and 43H", respectively, the top 45V', 45V", 45V''', 45V'''', 45H' and 45H", respectively, and the bottom 47V', 47V", 47V''', 47V'''', 47H' and 47H", respectively, of the rail 39V', 39V", 39V''', 39V'''', 39H' and 39H", respectively.

In FIG. 1, at least one of said rails 39V" of the second vertical member 25 has at least one slot 51A, 51B that begins at the front face 41V" of rail 39V", of the vertical member 25 and extends through at least a portion of the center 49V" of the rail 39V" of the second vertical member 25. Preferably, the apparatus of the present invention includes wherein slot 51A and slot 51B are both provided and wherein slots 51A and 51B further extend through all of the center 49V" of rail 39V" and terminate at the back face 43V" of rail 39V".

In a preferred embodiment of the instant invention, each slot 51A and 51B has a first end, a second end and a mouth having an opening disposed between the first and the second ends of each slot. The mouth opening preferably has a width from about ten to twelve inches, and a height from about two to four inches. It will be appreciated that the height and width of the mouth opening of the slot may vary to accommodate at least one tine of a fork lift or any similar machine capable of engaging the platform 2 of the instant invention and moving and/or placing the platform 2 to/in a desired location/position. Preferably, the instant invention provides both slot 51A and slot 51B, wherein slot 51A is positioned on the front face 41V" of the rail 39V" of the second vertical member 25 at the distal end 29 of the second vertical member 25, and wherein slot 51B is positioned on the front face 41V" of rail 39V" of the second vertical member 25 at the proximal end 27 of the second vertical member 25 as provided in FIG. 1. Most preferably, the distance taken along the lateral axis (not shown in FIG. 1) of the second vertical member 25 between the adjacent ends of each of the slots 51A and 51B relative to each other is from about one to twenty inches, so as to accommodate the tines of a conventional fork lift. It will be understood that if optional fourth vertical member 26 is employed in the instant invention one or more additional slots similar to slots 51A and 51B shall be provided on rail 39V'''' that shall be in alignment with slots 51A and B, respectively, to accommodate the length of the tines of a conventional fork lift. It will be appreciated by those persons skilled in the art that a fork lift is a self-propelled machine for hoisting and transporting heavy objects by means of fingers (tines) inserted under the load or in case of the bail clamp fork lift the fingers (clamps) are inserted around the load. The fork lift machine is not part of the instant invention.

The vertical and horizontal members of the platform 2 of the mechanical apparatus 1 for enabling the secure loading and transport of a load of the present are preferably rails as described herein, however, it will be appreciated by those persons skilled in the art that the rails may be various shapes, for example round or oval bars or "I" beams.

The arch shaped structure 31X of the mechanical apparatus of the present invention preferably has a radius of curvature 36 from about thirty to forty inches, and most preferably, thirty six inches. It will be appreciated that the radius of curvature 36 of the arch shaped structure 31X may be adjusted to accommodate various shapes and sizes, and that the width and length of the inner surface 34 of the arch shaped structure 31X may be varied to accommodate the characteristics of a particular good or load. Further, it will be understood that by those skilled in the art that the length, width, and height of the platform 2 and the arch shaped structure 31X of the present invention as described herein may be varied to accommodate various sizes, lengths and/or thickness and/or diameter of specific goods or loads to be loaded and/or transported. In a preferred embodiment of the instant invention, the radius of curvature 36 of each arch shaped structure 31A, B, C and D, respectively, is substantially identical.

In a preferred embodiment of the apparatus of the present invention as described herein, the apparatus further comprises the platform 2 and the first horizontal member 3 having (a) a portion of the middle section 37A of one arch shaped structure 31A in communication with the proximal end 5 of the first horizontal member 3 and (b) a portion of the middle section 37B of a second arch shaped structure 31B in communication with the distal end 7 of the first horizontal member 3, wherein the adjacent ends of the arch shaped structure 31A and the second arch shaped structure 31B are a distance of from about 42.0 to 50.0 inches from each other to provide a space to accommodate a conventional bail-clamp fork lift employed to load and unload round roll stock into and out of the apparatus.

Further, it will be appreciated that the apparatus of the present invention is made of materials, such as for example but not limited to a metal, steel, aluminum, or a polymer(s) such as for example but not limited to poly(vinyl chloride), and is capable of being formed, such as example by employing conventional welding or a molding processes well known by those skilled in the art, to establish a rigid platform 2 and arch shaped structure 31X.

In yet another embodiment of the instant invention, the apparatus as described herein, includes at least one support means 53X (wherein X is equal to A, B, C and D, respectively, and combinations thereof, see FIGS. 1–4) for supporting the weight of the load received in the arch shaped structure 31X, respectively, and more particularly the weight of the load resting on the proximal ends 33X of the arch shaped structure 31X, respectively. As shown in FIG. 1, one end 55C of the support means 53C is in juxtaposition to and in communication with at least a portion of the outer surface 32C of the arch shaped structure 31C and wherein another end 57C of the support means 53C is fixedly engaged to the front face 41H" of rail 39H" of the horizontal member 19. FIG. 1 also shows support means 53D in juxtaposition and in communication with at least a portion of the outer surface 32D of the arch shaped structure 31D and fixedly engaged to the front face of 41H". FIG. 2 shows support means 53A, 53B, 53C and 53D. FIG. 3 shows support means 53C and 53D. FIG. 4 shows support means 53B and 53C.

FIGS. 1 and 4 show an optional preferred embodiment of the instant invention wherein bridge means 61X (wherein X is equal to A, B, C and D, respectively and combinations thereof) is further provided for supporting the weight of the load received in the arch shaped structure 31X, and more particularly the weight of the load resting on the distal ends 35X of arch shaped structures 31X, respectively. The bridge means 61X has a distal end 63X, a proximal end 65X, a top 67X, a bottom 69X and a middle section 68X (wherein X is equal to A, B, C and D) wherein the middle section 68X is disposed between the distal end 63X, the proximal end 65X, the top 67X and the bottom 69X of bridge means 61X. In FIG. 1, the distal end 63A of the bridge means 61A is in juxtaposition to and in communication with at least a portion of the distal end 35D of the outer surface 32D of the arch shaped structure 31D and wherein the proximal end 65A of the bridge means 61A is in juxtaposition to and in communication with at least a portion of the distal end 35A of the outer surface 32A of arch shaped structure 31A. FIG. 1, shows a most preferred embodiment of the present invention that includes wherein the bottom 69A of the bridge means 61A is in juxtaposition to and in communication with the top 45V" of rail 39V" of the second vertical member 25. FIG. 4 shows bridge means 61D. Bridge means 61B and 61C (not shown in FIGS. 1–4) are optionally disposed in juxtaposition to and in communication with at least a portion of the outer surface 32X of the arch shaped structure 31X and wherein the bottom 69B and C of the bridge means 61B and 61C, respectively, is in juxtaposition to and in communication with the top 45V"" and 45V''', respectively, of rail 39V"" and 39V''', respectively. FIG. 4 shows bridge means 61D in juxtaposition to and in communication with at least a portion of the outer surface of arch shaped structures 31B and 31C and the top 45V' of rail 39V' of the first vertical member 11.

In another embodiment of the instant invention, the apparatus as described herein further includes at least one foot means 71X (wherein X is equal to A, B, C and D, respectively, and combinations thereof, as shown in FIGS. 1–4) for supporting the platform 2, wherein the foot means 71X is mounted to at least one of the rails 39H' and 39H".

In a preferred embodiment of the instant invention, at least one of the foot means 71A is mounted on the bottom 47H' of the rail 39H' of the first horizontal member 3 at the proximal end 5 of the first horizontal member 3, (b) at least one of the foot means 71D is mounted on the bottom 47H" of the rail 39H"" of the second horizontal member 19 at the distal end 23 of the second horizontal member 19, (c) at least one of the foot means 71B is mounted on the bottom 47H' of the rail 39H' at the distal end 7 of the first horizontal member 3, and (d) at least one of the foot means 71C is mounted on the bottom 47H" of the rail 39H" at the proximal end 21 of the second horizontal member 19. In a most preferred embodiment of the apparatus of the instant invention as described herein, the foot means 71A and 71D are mounted substantially in a parallel and aligned arrangement in relationship to each other as set forth in FIG. 2 and the foot means 71B and 71C are mounted substantially in a parallel and aligned arrangement in relationship to each other as set forth in FIG. 2 to provide a platform 2 that is stable and not prone to tipping when it is being loaded.

In yet another embodiment of the apparatus of the instant invention as described herein, at least one adjustable foot means 73X (wherein X is equal to A, B, C and D, respectively, and combinations thereof) for adjusting the movement and the position of the platform 2 is provided as shown in FIGS. 1, 3 and 4. The adjustable foot means 73X is mounted to at least one of the rails 39H' and/or 39H", and preferably is mounted to the bottom 47H' and/or 47H" of rail 39H' and/or 39H", respectively. In a preferred embodiment of the apparatus of this invention, adjustable foot means 73B is mounted on the bottom 47H' of the rail 39H' at the distal end 7 of the first horizontal member 3 and adjustable foot means 73C is mounted on the bottom 47H" of the rail 39H" at the proximal end 21 of the second horizontal member 19. In a most preferred embodiment of the apparatus of this invention, as described herein, the adjustable foot means 73B and 73C are mounted substantially in a parallel and aligned arrangement in relationship to each other as set forth in FIG. 4. The adjustable foot means 73X may be adjusted either to the right or left directions laterally to provide directional horizontal movement of the platform 2 when at least one slot of the platform 2 is engaged by the tines of a conventional fork lift, and physical force applied to the platform 2 by the fork lift. FIG. 4 shows that adjustable foot means 73X may be for example, one or more wheels or rollers, and axle assemblies 75B, 75C or circular objects such as a caster (not shown) that may be turned to provide movement of the platform 2 in a desired horizontal direction.

The apparatus of the instant invention includes wherein the adjustable foot means 73X is at least one foot hinge assembly 77X (wherein X is equal to A, B, C and D, respectively, and combinations thereof), that is disposed perpendicular to the bottom of the first and/or second horizontal members 3, 25, respectively, wherein the foot hinge assembly 77X has a foot hinge joint 78X and a foot hinge pin 79X (not shown) wherein the foot hinge pin 79X passes through the foot hinge joint 78X and is in friction engagement with the foot hinge joint 78X for adjusting the vertical movement and the position of the adjustable foot means 73X in an upward or downward position in the direction along the longitudinal axis of the rails 39H' and 39H", respectively, at an angle from about one degree to twenty degrees (about 1.0° to 20°) from the perpendicular position of the foot hinge assembly 77X in a direction toward the bottom of first horizontal member 3 and/or the second horizontal member 19 as shown in FIG. 3.

In yet another embodiment of the apparatus of this invention, FIGS. 1 and 3 show that the distal end 7 (not shown) of first horizontal member 3 and the proximal end 21 of the second horizontal member 19 are tapered 90 to allow for adjusting the movement and angle of the foot hinge assembly 77B and 77C without damaging the proximal end or distal end of rail 39H' and/or rail 39H".

In another optional embodiment of the apparatus of the instant invention as described herein, each arch shaped structure 31X is provided with a flange 82X disposed at the arch shaped structure's 31X proximal end 33X and a flange 84X disposed at the arch shaped structure's 31X distal end 35X for aiding in loading a round or elliptical shaped load onto and into and out of the arch shaped structure 31X, wherein X is equal to A, B, C, and D, respectively, and combinations thereof, as set forth in FIG. 2.

In another optional embodiment of the instant invention as described herein, a "U" shaped means 86 for engaging attachment means (not shown) for pulling the platform 2 is provided, wherein the "U" shaped means 86 is in communication with the front face 41', 41V", 41V''' and 41V'''' of at least one of the rails 39V', 39V", 39V''', and 39V'''' of at least one of the vertical members 11, 25, 10 and 26, respectively, as set forth in FIG. 2.

It will be appreciated by those skilled in the art that the present invention advantageously provides for an efficient and safe mechanical apparatus for loading and securing goods, such as a roll of paper 80' and/or 80" as shown in FIG. 4, for transportation by, such as for example, a motor vehicle and/or truck-trailer. Thus, it will be appreciated that the present invention has met the long unmet and unsolved need in the transportation industry in providing a mechanical apparatus for safely loading and transporting substantially circular goods of a bulky nature.

Whereas particular embodiments of the present invention have been described herein for the purpose of illustration, it will be evident to those persons skilled in the art that numerous variations of the details of the present invention may be made without departing from the invention as defined in the appended claims.

What is claimed is:

1. An apparatus for securing a load in transit comprising:
    a platform having (a) a first horizontal member having a proximal end, a distal end and a middle section that is disposed between said proximal end and said distal end of said horizontal member, (b) a first vertical member having a proximal end, a distal end and a middle section that is disposed between said proximal end and said distal end of said first vertical member, and wherein said proximal end of said first vertical member is in communication with said distal end of said first horizontal member, (c) a second horizontal member having a proximal end, a distal end and a middle section that is disposed between said proximal end and said distal end of said second horizontal member, wherein said proximal end of said second horizontal member is in communication with said distal end of said first vertical member, and (d) a second vertical member having a proximal end, a distal end and a middle section that is disposed between said proximal end and said distal end of said second vertical member, wherein said proximal end of said second vertical member is in communication with said distal end of said second horizontal member, and wherein said distal end of said second vertical member is in communication with said proximal end of said first horizontal member, and wherein said first horizontal member is parallel in relation to said second horizontal member, and wherein said first vertical member is parallel in relation to said second vertical member;
    at least one arch shaped structure wherein said arch shaped structure has a proximal end, a distal end and a middle section disposed between said proximal end and said distal end of said arch shaped structure, and wherein said arch shaped structure has an outer surface and an inner surface, and wherein at least a portion of said arch shaped structure is positioned above at least a portion of one of said horizontal members, and wherein at least a portion of said middle section of said arch shaped structure is in communication with a portion of at least one of said proximal end, distal end, middle section and combinations thereof of at least one of said horizontal members, and wherein at least a portion of said middle section of said arch shaped structure is positioned, with regard to the longitudinal axis of at least one of said horizontal members, in the same longitudinal plane of at least one of said horizontal members of said platform, and wherein said proximal end and said distal end of said arch shaped structure are positioned, relative to each other, in similar upward directions and in opposing outward directions in such a manner that said proximal end and said distal end of said arch shaped structure lie on opposite sides of the longitudinal plane with regard to the longitudinal axis of said horizontal member.

2. The apparatus of claim 1 wherein said vertical members and said horizontal members each comprise a rail wherein said rail has a front face, a back face, a top and a bottom, and a center section disposed between said front face, said back face, said top and said bottom of said rail.

3. The apparatus of claim 2 wherein at least one of said rails of said vertical members has at least one slot that begins at said front face of said rail of said vertical member and extends through at least a portion of said center of said rail of said vertical member.

4. The apparatus of claim 3 wherein said slot further extends through all of said center of said rail and terminates at said back face of said rail.

5. The apparatus of claim 4 wherein said slot is positioned on said rail of said second vertical member at said distal end of said second vertical member, and wherein another said slot is positioned on said rail of said second vertical member at said proximal end of said second vertical member.

6. The apparatus of claim 3 wherein said slot is positioned on said rail of said second vertical member at said distal end of said second vertical member, and wherein another said slot is positioned on said rail of said second vertical member at said proximal end of said second vertical member.

7. The apparatus of claim 2 further comprising at least one foot means for supporting said platform, wherein said foot means is mounted to said bottom of at least one of said rails.

8. The apparatus of claim 7 wherein (a) at least one of said foot means is mounted on said bottom of said rail of said first horizontal member at said proximal end of said first horizontal member, (b) at least one of said foot means is mounted on said bottom of said rail of said second horizontal member at said distal end of said second horizontal member, (c) at least one of said foot means is mounted on said bottom of said rail at said distal end of said first horizontal member, and (d) at least one of said foot means is mounted on said bottom of said rail at said proximal end of said second horizontal member.

9. The apparatus of claim 8 wherein said foot means are mounted substantially in a parallel arrangement in relationship to each other.

10. The apparatus of claim 7 further comprising at least one adjustable foot means for adjusting the movement and the position of said platform, wherein said adjustable foot means is mounted to said bottom of at least one of said rails.

11. The apparatus of claim 10 wherein (a) at least one of said adjustable foot means is mounted on said bottom of said rail of said distal end of said first horizontal member, and (b) at least one of said adjustable foot means is mounted on said bottom of said rail of said proximal end of said second horizontal member.

12. The apparatus of claim 11 wherein said adjustable foot means located on said distal end of said first horizontal member and said adjustable foot means located on said proximal end of said second horizontal member are mounted in a parallel and aligned arrangement in relationship to each other.

13. The apparatus of claim 12 wherein said adjustable foot means includes at least one selected from the group of an axle having at least one revolving wheel, a roller, and a caster, and combinations thereof.

14. The apparatus of claim 12 wherein said adjustable foot means is at least one foot assembly that is disposed perpendicular to said bottom of said first and second horizontal members, said foot assembly having a foot hinge joint and a foot hinge pin, wherein said foot hinge pin passes through said foot hinge joint and is in friction engagement with said foot hinge joint for adjusting the vertical movement and the position of said adjustable foot means in an upward and downward position in the direction along the longitudinal axis of said rails of said first and second horizontal members.

15. The apparatus of claim 14 wherein said adjustable foot means is adjusted at an angle of from about 1.0 to 20.0 degrees from said perpendicular position in a direction toward said bottoms of said first and second horizontal members.

16. The apparatus of claim 15 including wherein said adjustable foot means further provides horizontal movement of said platform in a right or left lateral direction.

17. The apparatus of claim 11 wherein said foot means is adjusted for providing horizontal movement of said platform in a right or left lateral direction.

18. The apparatus of claim 2 comprising a U-shaped means for engaging attachment means for pulling said platform, wherein said U-shaped means is in communication with said front face of at least one of said rail of at least one of said vertical members.

19. The apparatus of claim 2 further comprising at least one bridge means for supporting the weight of the load received in at least one of said arch shaped structures, wherein said bridge means has a distal end, a proximal end, a top, a bottom, and a middle section disposed between said distal end, said proximal end, said top and said bottom of said bridge means, and wherein said distal end of said bridge means is in juxtaposition to and in communication with at least a portion of said distal end of the outer surface of said arch shaped structure that is in communication with said second horizontal member, and wherein said proximal end of said bridge means is in juxtaposition to and in communication with at least a portion of the distal end of the outer surface of said arch shaped structure that is in communication with said first horizontal member and in parallel alignment with said arch shaped structure of said second horizontal member.

20. The apparatus of claim 19 wherein said bottom of said bridge means is in juxtaposition to and in communication with said top of one of said rails of one of said vertical members.

21. The apparatus of claim 2 including at least one support means for supporting the weight of the load received in said arch shaped structure, wherein one end of said support means is in juxtaposition to and in communication with at least a portion of said outer surface of said arch shaped structure and wherein another end of said support means is fixedly engaged to said front face of said rail of said horizontal member.

22. The mechanical apparatus of claim 1 further comprising said platform including a third vertical member and a fourth vertical member, wherein said third vertical member and said fourth vertical member are each disposed perpendicular to and between and in communication with said first horizontal member and said second horizontal member, and wherein said third and fourth vertical members are positioned parallel to said first and second vertical members.

23. The mechanical apparatus of claim 22 wherein said fourth vertical member is positioned relative to said first vertical member, closer to said second vertical member than said first vertical member, and wherein said fourth vertical member has at least one slot on a face of said fourth vertical member.

24. The apparatus of claim 1 wherein said inner surface of each of said arch shaped structures has an identical radius of curvature.

25. The apparatus of claim 1 comprising a first flange disposed at said proximal end of at least one of said arch shaped structures and a second flange disposed at said distal end of at least one of said arch shaped structures for aiding in loading a round or elliptical shaped load onto and into and out of said arch shaped structure.

* * * * *